(12) United States Patent
Ritter et al.

(10) Patent No.: US 9,623,699 B2
(45) Date of Patent: Apr. 18, 2017

(54) LAMINATION APPARATUS AND METHOD FOR SHEET MATERIALS HAVING TEMPERATURE-SENSITIVE ELEMENTS, AND DOCUMENTS PRODUCED THEREBY

(75) Inventors: Ulrich Ritter, Nidda-Schwickartshausen (DE); Samuel Schindler, Gruesch (CH)

(73) Assignee: U-NICA Technology AG, Malans (CH)

( * ) Notice: Subject to any disclaimer, the term of this patent is extended or adjusted under 35 U.S.C. 154(b) by 0 days.

(21) Appl. No.: 14/129,671

(22) PCT Filed: Jun. 4, 2012

(86) PCT No.: PCT/EP2012/002352
§ 371 (c)(1),
(2), (4) Date: Feb. 3, 2014

(87) PCT Pub. No.: WO2013/000535
PCT Pub. Date: Jan. 3, 2013

(65) Prior Publication Data
US 2014/0193615 A1   Jul. 10, 2014

(30) Foreign Application Priority Data
Jun. 28, 2011   (EP) .................................... 11005223

(51) Int. Cl.
B42D 25/45   (2014.01)
B42D 25/21   (2014.01)
(Continued)

(52) U.S. Cl.
CPC .............. B42D 25/45 (2014.10); B32B 37/06 (2013.01); B32B 41/00 (2013.01); B42D 25/00 (2014.10);
(Continued)

(58) Field of Classification Search
CPC ..... B32B 37/06; B32B 41/00; B32B 2309/02; B32B 2309/022; B32B 2309/70;
(Continued)

(56) References Cited

U.S. PATENT DOCUMENTS 6,264,774 B1 * 7/2001 Lenz ..................... B32B 38/004
156/359
2006/0169405 A1   8/2006 Smith et al.
(Continued)

FOREIGN PATENT DOCUMENTS

EP   0 013 557 A2   7/1980
EP   1 230 092 A2   8/2002
(Continued)

OTHER PUBLICATIONS

Translation of IDS referenece EP 0013557 A2, published Jul. 23, 1980, Patentee Hoechst Aktiengesellschaft.*
(Continued)

*Primary Examiner* — George Koch
(74) *Attorney, Agent, or Firm* — Sughrue Mion, PLLC

(57) ABSTRACT

The invention specifies an apparatus for applying a film (7) to a substrate (2) by lamination. This apparatus has a heating device (12, 19), which makes it possible for different regions of the film (7) and/or the substrate (2) to be exposed specifically to different temperatures. It is thus also possible to process substrates or films which contain temperature-sensitive elements, e.g. security elements based on bacteriorhodopsin. For this purpose, the heating device comprises a plurality of heating elements (19) which can be activated separately, and therefore different regions of a heating surface (12) can be subjected specifically to different levels of heating power. In order to compensate for irregularities on the surface of the substrate or of the film, the apparatus may have a flexible mating surface (21) which is arranged
(Continued)

opposite the healing surface and can be subjected to pressure pneumatically by way of a pressure chamber (22). Overall, this makes it possible to produce high-security documents with temperature-sensitive security features, the properties of which meet extremely stringent requirements relating to prevention of manipulation and forgery.

16 Claims, 7 Drawing Sheets

(51) Int. Cl.
| | | |
|---|---|---|
| *B32B 37/06* | (2006.01) | |
| *B32B 41/00* | (2006.01) | |
| *B42D 25/29* | (2014.01) | |
| *B42D 25/00* | (2014.01) | |
| *B42D 25/455* | (2014.01) | |
| *B42D 25/24* | (2014.01) | |

(52) U.S. Cl.
CPC .............. *B42D 25/21* (2014.10); *B42D 25/29* (2014.10); *B32B 2425/00* (2013.01); *B32B 2429/00* (2013.01); *B42D 25/24* (2014.10); *B42D 25/455* (2014.10); *B42D 2035/24* (2013.01); *Y10T 428/24826* (2015.01)

(58) Field of Classification Search
CPC ............ B32B 2425/00; B32B 2429/00; B29C 66/91411; B29C 66/91413; B29C 66/91421; B29C 66/91423
USPC .................. 156/358, 359, 367, 379.9, 583.4
See application file for complete search history.

(56) References Cited

U.S. PATENT DOCUMENTS

| | | | | |
|---|---|---|---|---|
| 2009/0317960 | A1* | 12/2009 | Izumi | .................. H01L 21/2007 438/455 |
| 2013/0032288 | A1* | 2/2013 | Lien | .................... B32B 37/0046 156/290 |

FOREIGN PATENT DOCUMENTS

| | | |
|---|---|---|
| EP | 1 380 442 A1 | 1/2004 |
| EP | 1 516 749 A2 | 3/2005 |
| EP | 2 082 894 A2 | 7/2009 |
| FR | 2 833 514 A1 | 6/2003 |
| GB | 1354615 A | 6/1974 |
| JP | 2010-56005 A | 3/2010 |
| WO | 95/09084 A1 | 4/1995 |
| WO | 01/18748 A1 | 3/2001 |
| WO | 2011/085174 A2 | 7/2011 |

OTHER PUBLICATIONS

Translation of IDS reference JP 2010-56005 A, published Mar. 11, 2010, Patent Manii KK.*
International Search Report of PCT/EP2012/002352, dated Sep. 19, 2012.
Eisenbach, Michael, et al.; The Light-Driven Proton Pump of Halobacterium Halobium; Mechanism and Function; Current Topics in Membranes and Transport; Department of Membrane Research; The Weizmann Institute of Science; vol. 12.
Hiraki, Kenji, et al.; Phase Transitions of the Purple Membrane and the Brown Holo-Membrane X-Ray Diffraction, Circular Dichroism Spectrum and Absorption Spectrum Studies; Biochimica et Biophysica Acta, 647 (1981).
International Preliminary Report on Patentability issued in corresponding PCT/EP2012/002352 dated Jan. 7, 2014.

* cited by examiner

LAMINATION APPARATUS AND METHOD FOR SHEET MATERIALS HAVING TEMPERATURE-SENSITIVE ELEMENTS, AND DOCUMENTS PRODUCED THEREBY

CROSS REFERENCE TO RELATED APPLICATIONS

This application is a National Stage of International Application No. PCT/EP2012/002352 filed Jun. 4, 2012, claiming priority based on European Patent Application No. 11 005 223.0, filed Jun. 28, 2011, the contents of all of which are incorporated herein by reference in their entirety.

TECHNICAL FIELD

The present invention relates to an apparatus and a method for applying a film to a substrate by means of the action of pressure and heat (lamination). The proposed apparatuses and methods are particularly suitable for applying films which contain temperature-sensitive elements. In particular, the temperature-sensitive element may be an element that contains bacteriorhodopsin, for example a security feature or an optical data storage element on the basis of bacteriorhodopsin. The apparatus and method make it possible for elements of this type to retain their function or at least to recover their function after a certain time after application of the film in spite of the use of the heat necessary for this purpose. They are thus particularly suitable for producing documents that have to meet high security requirements, for example passports. The present invention also relates to documents produced accordingly.

PRIOR ART

Many data carriers or information carriers, for example identification cards, personalised pages for passports, or credit cards and similar transaction cards, must have a high level of protection against forgery and manipulation. In the case of a passport, a personalised page generally contains the data of the passport holder and may not only assume the form of an identity card for the holder of the passport (what is known as a data page or holder page), but may also be a visa page, for example.

To increase the level of protection against forgery, a large number of security features can be integrated on or in such data carriers. For this purpose, it is known for example from EP-A1-1380442 to accommodate security features of this type in a layered structure. On the one hand, visible features that can be verified with the naked eye (what, are known as first-level features or level-1 features) and on the other hand features that can be detected only with tools (second-level and third-level features or level-2 and level-3 features) are used as security features for identification and authentication. To apply the security features to the document, it is routine practice to provide a substrate with a transparent single-layer or multi-layer film by means of a lamination method. The film may be a conventional lamination sheet material, which, after the lamination, completely remains on the substrate, but may also be what is known as a thin film applied in a film-transfer process, for example. The layers thus applied, for example, may contain high-quality holograms, such as a Kinegram®, volume holograms, 2D/3D holograms, E-beam holograms or other stereographic effects as well as combinations of individual variants. Further visually identifiable security elements may also consist of logos or lettering on the basis of printed coloured pigments or coloured pigments made visible by laser radiation (for example, see EP-B1-1230092), which, due to their chemical nature and the specific application method and occasionally due to an additionally performed data encryption, can meet the highest security requirements. Of course, security features of a different security level, for example machine-readable features (third-level or level-3 features) may also be implemented in the applied layers.

In the case of a passport, the lamination is usually, performed on the first inside face of the passport booklet (endpaper) or on the front or rear side of the first page. The production of such a passport divided into two main steps: a first step is a production of the passport booklet with identification number and optionally a first personalisation on the personalised page in respect of the subsequent holder of the document. In a second step, the blank of the passport booklet produced in the first step is definitively personalised. This last personalisation step is often an inkjet printing or a laser marking of personal data, such as the name and date of birth of the subsequent holder of the passport. During the course of the second step, the mentioned film is often applied to the document, in particular in the case of passports at the highest security level, and the document may then contain high-quality security features and elements. The security features may optionally in turn contain personalised data. The applied film allows visual identification of the underlying substrate layer, which for example may consist of paper or a plastic, such as polycarbonate, and simultaneously has a protection and security function for said substrate layer.

A last step when manufacturing a passport or another security document is therefore in many cases the lamination of a translucent film with the above-mentioned security elements and occasionally also with personal data. Dedicated devices are provided on the market for the application of such films, for example Diletta CPL180HD, Security Printing Consulting SPS AL1200 or Digital Identification Solutions DISPP380X.

Devices of this type, under pressure and increased temperature, laminate onto the substrate a sheet material provided with an adhesive coating via a rotary or stroke method once the document has been aligned with the devices, placed thereon and introduced thereinto. Alternatively, the lamination process may also be carried out without adhesive, wherein special sheet materials and higher temperatures are then used.

It is generally sought in the prior art to keep the pressure and temperature conditions constant to a certain extent during the lamination process. Here, a certain inhomogeneity of the temperature over the extent of the film to be laminated is often unavoidable, yet normally undesirable. The maximum temperatures of known devices that can be achieved fluctuate between 160° C. and 250° C., wherein the usual operating temperatures are typically slightly lower, specifically usually between 110° C. and 160° C.; in the case of adhesive-free lamination with sheet materials on the basis of polycarbonate (PC), the operating temperature however is often above 180° C. Temperatures in this range are necessary depending on the material in order to produce a laminate that meets the security requirements in respect of its adhesion. WO 95/09084, for example, mentions the fact that laminating conditions with temperatures between 120° C. and 150° C. for periods of time of less than a minute constitute "low laminating conditions". EP-A2-1516749 even discloses temperatures above 190° C. for the lamination process.

The pressure applied may likewise be considerable. Pressures of more than 200 N/cm² and sometimes up to more than 500 N/cm² are usually used (see EP-A2-1516749). For some pressure-sensitive security features, the usual pressure conditions exceed the maximum values for retaining the function of said features. Protection measures are therefore sometimes implemented. For example, pressure-sensitive RFID chips are often embedded in a window of the layered structure, such that the carrier (the substrate) itself absorbs the pressure. Such a window structure is described for example in WO-A1-01/18748.

For the protection of temperature-sensitive security features, such as retinal proteins, which have an extremely high importance both as a visual and a machine-readable security feature, there is by contrast no satisfactory solution for producing a durable laminate with retention of the function of the retinal protein. For example, it can be derived from measurements of the phase transitions of a pure bacteriorhodopsin-purple membrane complex (BR-PM) that the limit temperature at which a BR-PM complex loses its function at least temporarily (reversibly) is approximately 80° C. (Eisenbach et. al., Curr. Top. Membr. Trans. (1979) 12:165-248 and Hiraki et. al., Biochim. Biophys. Acta (1981) 1647:12-28). Such a low limit temperature does not allow production of the required laminate with retention of the function of the BR-PM complex by conventional methods. A further phase transition (as also with many other proteins) observed at approximately 100° C. and is the result of a denaturation of the BR-PM complex, which causes an irreversible loss of function of the security feature containing BR-PM. From 120° C., thermal decomposition of the molecule complex finally starts. Even with protection measures, a temperature of approximately 90-100° C. must not be exceeded, even temporarily, when processing security features on the basis of BR-PM complexes.

SUMMARY OF THE INVENTION

It is an object of the invention to provide an apparatus for applying a single-layer or multi-layer film to a substrate with application of temperature and pressure, said apparatus making it possible to apply films containing temperature-sensitive elements, for example security features based on the BR-PM complex, without destroying the temperature-sensitive element.

An apparatus for applying a film to substrate by lamination is thus disclosed, said apparatus comprising a heating device in order to heat the film and/or the substrate and comprising a pressing device. In order to enable the use of a film or a substrate containing temperature-sensitive elements, the heating device is designed to selectively expose different, predefined regions of the film and/or of the substrate to different temperatures.

The invention makes it possible to apply a film to a substrate in such a way that regions of the film and/or of the substrate containing temperature-sensitive elements are not exposed to excessive temperatures, such that the function of the temperature-sensitive elements is retained. At the same time, the invention makes it possible to permanently interconnect the film and the substrate in a highly reliable manner in regions not containing temperature-sensitive elements.

In this context, lamination is understood to mean any method in which a single-layer or multi-layer film is applied to a substrate under the action of pressure and heat and in which the film is connected in a permanent manner to the substrate, at least in some regions. The film and the substrate can be provided with temperature-activated and/or pressure-activated adhesives, however such adhesives may also be omitted. So-called transfer methods, in which the film is located on a carrier before lamination, the film together with the carrier is laminated onto the substrate, and the carrier is then removed, are also understood to be lamination methods.

In particular, the heating device can be configured in such a way that it exposes a first region of the film and/or of the substrate before or during the pressing process to at least one first predetermined temperature, whereas it exposes a second region of the film and/or of the substrate before or during the pressing process to a temperature that is at least 10° C. lower, preferably at least 20° C. lower, even better at least 30° C. lower, or at least 40° C. lower, than the first temperature. The first temperature in particular may be selected so as to be sufficiently high in order to permanently connect the film in the first region to the substrate. This temperature is usually at least 110° C., preferably at least 120° C., and, depending on the application, may also be at least 140° C. or even 160° C., and in the case of adhesive-free lamination may even be more than 180° C. For the application with BR-PM complexes, the second temperature, where possible, should be lower than 100° C., preferably lower than 95° C., even better lower than 90° C., and particularly preferably lower than 80° C., in order to ensure retention of the function of the BR-PM complex. For other types of temperature-sensitive elements, the second temperature may also assume other values, however.

The first region preferably surrounds the second region substantially completely (as considered in the plane of the film, that is to say as considered two-dimensionally). It is thus in particular possible to create a stable edge composite around the temperature-sensitive element. This safeguards the stability of the produced document, even if the connection between the substrate and the film in the second region should turn out to be less durable than that in the first region.

A large number of various designs for laminators are known from the prior art, and the invention is not limited to a specific design. Independently of the specific design, the heating device preferably defines a heating surface for heating the film and/or the substrate. The heating surface is preferable substantially flat (that is to say it defines a primary plane, from which, if need be, elements may protrude or which may have indentations, wherein the primary plane itself however is not curved); the heating surface may also be curved however and in particular may have the form of a cylinder, for example. The apparatus then preferably comprises a control device, which activates the heating device in such a way that the heating surface is heated in a first region at least to a predetermined first temperature and in a second region assumes a temperature that is at least 10° C. lower, preferably at least 20° C. lower, than the first temperature. Here, both the first and the second region actually heat the substrate and/or the film, that is to say these regions are not edge regions of the heating surface, which, during normal operation, are not involved in the laminating procedure. With respect to the preferred absolute values of the first and second temperature, above-mentioned considerations are valid. In particular, it is in turn preferable for the first region to surround the second region substantially completely. If the heating surface has the form of a cylinder, it is at least preferable if the first region adjoins both sides of the second region transverse to the conveying direction.

The heating device preferably comprises not only an individual heating element, but a plurality of heating elements, and the apparatus then has a control device in order to separately activate different heating elements, such that different regions of the heating surface can be acted on selectively with different heating powers in order to thus selectively produce different temperatures in different regions of the heating surface.

In particular, the heating elements can be thermostatically controlled separately from one another (individually or in two or more groups), that is to say the control device then has a plurality of controllers, in order to separately control the power of different heating elements.

One or more heating elements may cooperate with a specific region of the heating surface in order to heat said region. The regions that can be heated separately in this way can be arranged in a regular two-dimensional pattern, in particular a matrix-shaped, trigonal or hexagonal pattern. The regions may also be arranged irregularly however. If the regions are arranged in a pattern, the pattern preferably substantially covers the entire heating surface; it may also be provided only in a part of the heating surface. It is thus possible to adapt the apparatus to different arrangements of temperature-sensitive elements.

The heating elements may be formed by power semiconductors, in particular power transistors, of which the waste heat is used for selective heating. To this end, the power semiconductors can be connected to heat sinks, of which the surfaces each form part of the heating surface or which themselves are in turn connected to the heating surface. The power semiconductors however may also be introduced directly into the body forming the heating surface or otherwise connected thereto, in particular with use of commercially available heat sink paste. Power semiconductors have the advantage that they can be easily activated and controlled and have short reaction time thanks to their low thermal capacity. Instead of power semiconductors, it is also possible however to use conventional ohmic resistors or other known types of electric heating elements, for example heating cartridges or thick-film or thin-film heating elements.

Due to the necessary high thermal conductivity, the heating surface preferably consists of a metal, in particular aluminium, copper alloys or other materials having high thermal conductivity. The heating surface is generally assigned an opposing surface, which is arranged opposite the heating surface and is designed to press the substrate and the film onto the heating surface. This opposing surface may also be flat or curved, in particular cylindrical. This opposing surface is preferably complementary to the heating surface and substantially flat, however. The opposing surface may consist in principle of metal, plastic or any other materials. In order to ensure a uniform distribution of the contact pressure, even with irregularities of the heating surface and/or of the document to be laminated, it is advantageous however if the opposing surface is pliant and preferably resilient. In particular, it can be acted on pneumatically with air pressure in order to build up the necessary contact pressure. To this end, the apparatus may have a corresponding pressure chamber, which is delimited in part by the opposing surface, and a compressor. A control device may then be designed to control the pressure in the pressure chamber. The control device in particular may activate at least one valve. The term "pliant" is to be understood to mean that the opposing surface, due to its material selection and other design, is able to substantially adapt to irregularities of the heating surface and of the elements inserted between the heating surface and opposing surface. In particular, plastics such as soft PVC, PP/EPDM, PU, TPE-E, or rubber, with or without textile insert, can be used as materials. The range of the Shore A hardness of such materials may lie between 20 and 80 for example, preferably 30-70, particularly preferably 30-50. The modulus of elasticity (measured under tension) is preferably below 100 MPa, in particular in the range 0.3-30 MPa, particularly preferably below 10 MPa, or even below 3 MPa. Such a pliant opposing surface is even then advantageous if the heating surface cannot be heated in different regions to different temperatures. The present invention accordingly also relates generally to an apparatus for applying a single-layer or multi-layer film to a carrier by means of lamination, said apparatus having a heatable heating surface and a pliant and preferably resilient opposing surface arranged opposite the heating surface in order to press the film and the substrate jointly against, the heating surface.

In accordance with a second aspect, the present invention provides a method for providing a substrate with a film by lamination. This method comprises the following steps:

providing the substrate and the film; and pressing the film against the substrate under the action of temperature, wherein different regions of the film and/or of the substrate are selectively exposed during the pressing process to different temperatures.

In particular, the method according to the invention can be carried out in that the film and/or the substrate is/are heated by a heating surface. Here, the heating surface can be acted on selectively by a plurality of heating elements in different regions with different heating powers. In particular, the power of different heating elements can be thermostatically controlled separately means or a plurality of independent controllers.

This method can be implemented by means of an apparatus as has been specified above or also by means of other apparatuses. The above considerations in conjunction with the apparatus according to the invention equally apply analogously to the proposed method. In particular, it is preferable if a first region of the film and/or of the substrate is exposed during the pressing process to at least one first predetermined temperature in order to connect the film in the first region to the substrate in a permanent manner, and if a second region of the film and/or of the substrate is exposed during the pressing process to a temperature that is at least 10° C. lower, preferably 20° C. lower, and depending on the application at least 30° C. or even at least 40° C. lower, than the first temperature. The absolute temperature values are preferably selected here as already specified above.

The method according to the invention is particularly suitable for situations in which the film and/or the substrate has/have at least one temperature-sensitive element. The film and/or the substrate is/are then selectively exposed during the pressing process in different regions to different temperatures in such a way that the temperature-sensitive element is functionally retained. If the temperature-sensitive element contains a retinal protein, for example bacteriorhodopsin and in particular a BR-PM complex, the film and/or the substrate is preferably exposed in a region containing the temperature-sensitive element to a temperature of at most 100° C., even better at most 95° C., preferably at most 90° C., particularly preferably at most 80° C., whereas it is exposed in a region not containing the temperature-sensitive element to a temperature of at least 110° C., preferably at least 120° C., and depending on the application possibly more than 140° C., 160° C. or even more than 180° C.

In accordance with a further aspect, the present invention relates to a document which has a substrate and a film connected thereto by lamination, wherein the document has been produced by the previously specified method.

In accordance with a related aspect, the invention relates to a document which has a substrate and a film connected thereto by lamination, wherein the film and/or the substrate comprises at least one temperature-sensitive element. Here, the substrate and the film, in a region containing the temperature-sensitive element, are interconnected in a different manner from in a region not containing the temperature-sensitive element. The term "in a different manner" is to be understood here such that it includes situations in which the connection in the mentioned regions is indeed produced by the same mechanism of action (for example the same adhesive), but has a different strength (for example different separating forces or different microscopic structure of the connection). The term also includes situations however in which the temperature-sensitive region is connected completely differently compared to the other regions, for example presence of an adhesive only in the temperature-sensitive region or presence of different adhesives in the different regions. In particular, a connection in the region of the temperature-sensitive element may also be omitted completely. The temperature-sensitive element in particular may form a security feature of the document. It may however also carry other types of data, for example data that can be read out optically. In particular, the temperature-sensitive element may contain a retinal protein, in particular bacteriorhodopsin.

For example, the document may be one of the following documents:
an identity card, a driving license, a health card, a charge card or another card-like document; or
a passport with at least one personalised page, in particular with a holder page and/or at least one visa page, which comprises the substrate and the film.

BRIEF DESCRIPTION OF THE DRAWINGS

Preferred embodiments of the invention will be described hereinafter on the basis of the drawings, which are merely explanatory and are not to be interpreted as limiting, and in which.

DESCRIPTION OF PREFERRED EMBODIMENTS

In preferred embodiments, the present invention is used to apply a sheet material containing a retinal protein, in particular BR-PM, to a substrate. To this end, a lamination method is proposed that on the one hand meets the criteria with respect to the delamination behaviour, the optically clean appearance, that is to say a homogeneous transparency over the surface, absence of bubbles, etc., for a high-security security document, such as a passport, and that on the other hand ensures the retention of the function of retinal proteins to be used, in particular BR-PM. The term "function" is to be understood to mean the colour change of the retinal protein within a specific reaction period when irradiated with light. This function is a precondition for its suitability as a visually perceptible security feature (first-/second-level feature) and also its suitability as an optical data store or third-level feature. For good perceptibility of the visual feature, a strong light source with a suitable frequency component, for example an LED source or halogen source, may be helpful, in particular in interior spaces (in this case the visual feature is a second-level feature).

Figure 1:
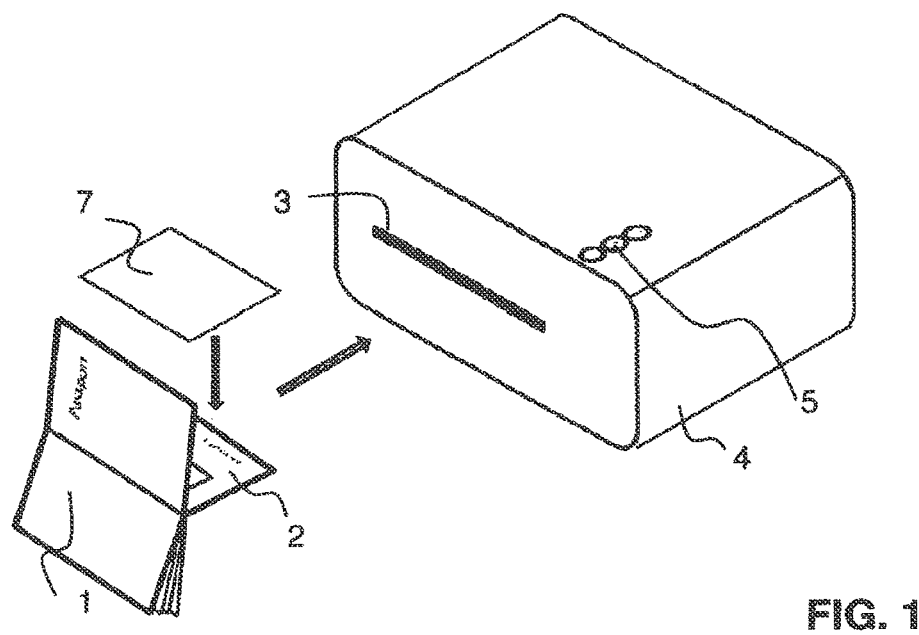
FIG. 1 shows a passport booklet with lamination or transfer film with provided lamination apparatus with slot feed.
Figure 2:
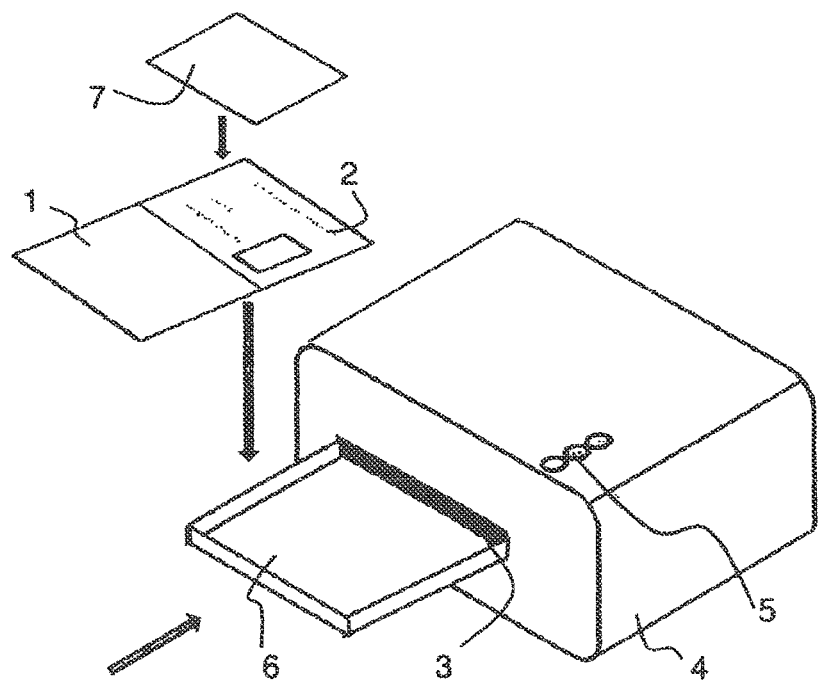
FIG. 2 shows a passport booklet with lamination or transfer film with provided lamination apparatus with heated drawer feed.
Figure 3:
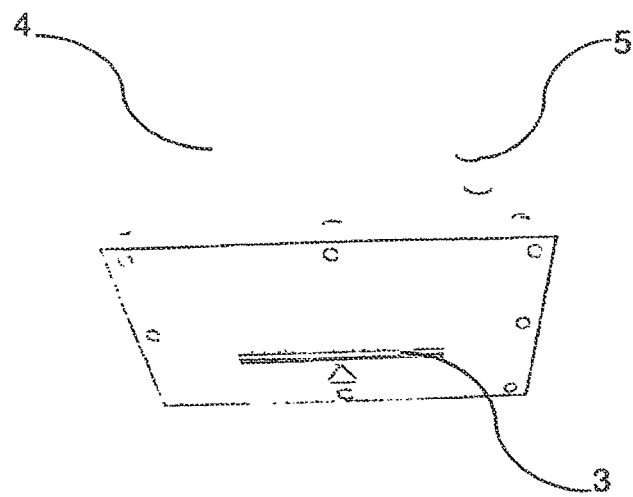
FIG. 3 shows a pilot example of a lamination apparatus.

The exemplary embodiment of FIG. 1 schematically shows a laminator 4 with operating elements 5. A security document 1 (here a passport) contains a personalised page, which forms a substrate 2. The personalised page is introduced into a feed slot 3. A prototype of this design is also shown in FIG. 3 in FIG. 2, a variant that has an movable heating surface, which is integrated into a drawer 6, is schematically illustrated. This drawer receives the document inserted completely and correctly, for example a passport with sewn-in lamination sheet material opened at the correct point. This device variant has the advantage of easy cleaning. Numerous further variants are conceivable. A device variant that operates largely automatically, that is to say receives the documents to be laminated, for example passports, in unpersonalised form via a conveyor device and, after lamination and optionally a subsequent detachment of a carrier sheet material, makes the documents automatically available to a further processing step, is thus conceivable. Laminators of this and other designs have long been known in principle from the prior art.

Figure 4:
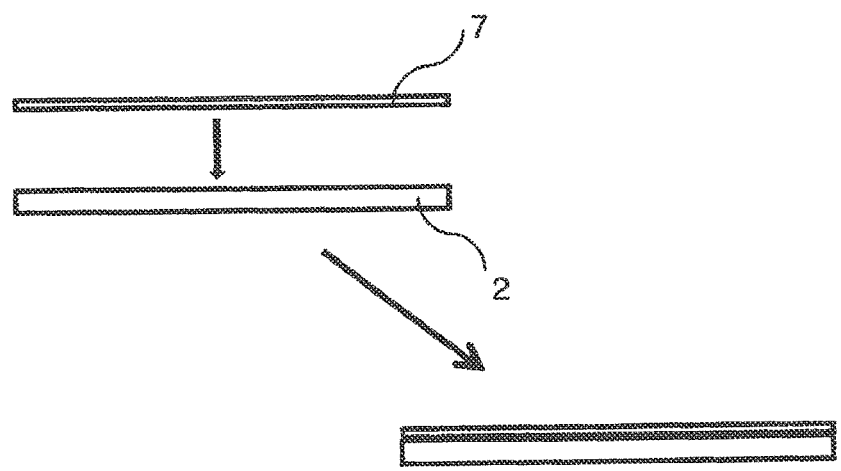
FIG. 4 shows a schematic diagram for application of a lamination film.

FIG. 4 illustrates the application of a cover sheet material 7 by "conventional" lamination. This may occur with use of suitable adhesives (in particular of temperature-activated hot-melt adhesives) or in an adhesive-free manner. The cover sheet materials 7 used here, which are applied by the lamination process, consist for example of PET, PC or PVC and, on the side facing the substrate 2, often have a coating of commercially available adhesives, such as the Degalan types by Evonik-Degussa or the Beva types by CTS. With regard to the material selection in the case of the cover sheet materials for the present method, there are in principle no restrictions with respect to the commercially available sheet materials. Typical sheet material thicknesses are between 5 and 100 μm. For example, sheet materials having a thickness of 23 μm are obtainable on the market.

Figure 5:
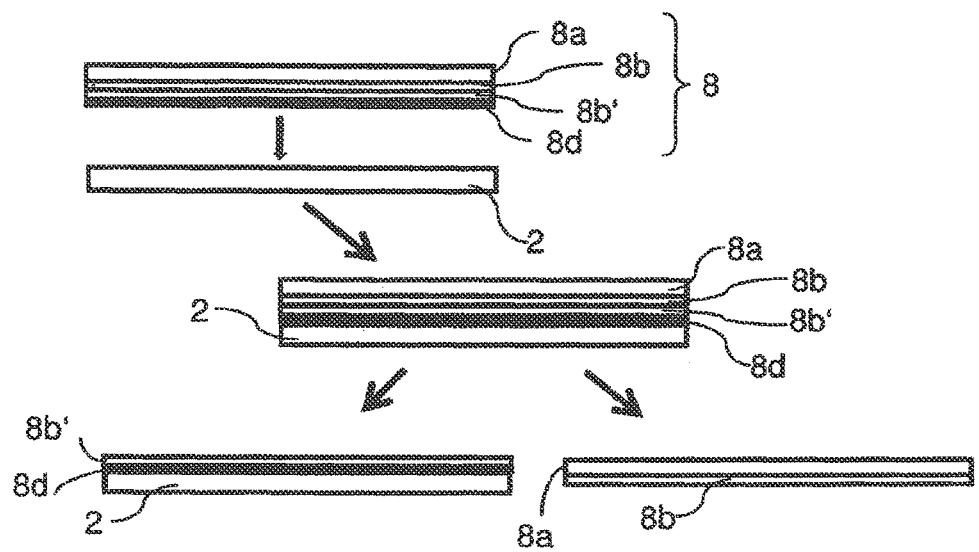
FIG. 5 shows a schematic diagram for application of a thin film with subsequent removal of the carrier film.
Figure 6:
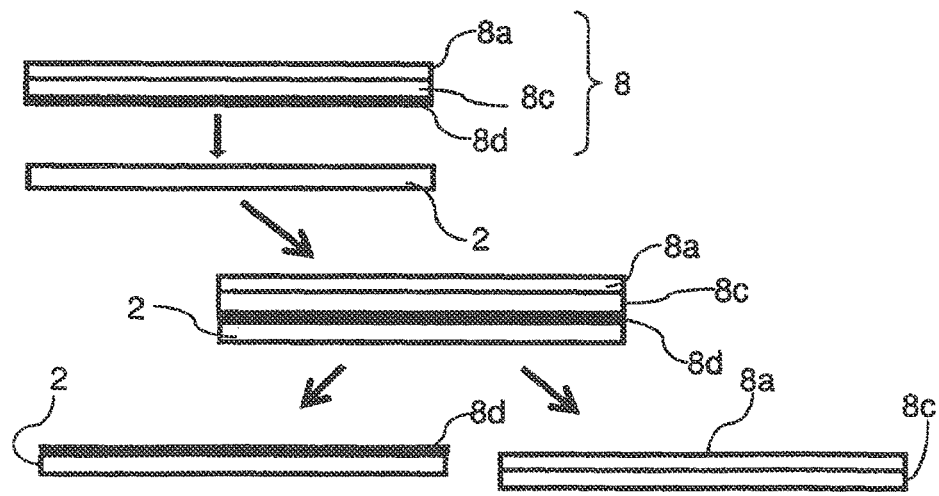
FIG. 6 shows a schematic diagram for application of a thin film with subsequent removal of a siliconised paper-based carrier.

Instead of sheet materials for conventional lamination, what are known as transfer sheet material, that is to say carrier sheet materials with a thin mono-layer or multi-layer film ("thin film") carried thereon can also be used. The carrier sheet material is in this case removed once the thin film has been applied to the substrate. In the case of transfer sheet materials, paper carriers with a silicone separating layer are often employed, besides carrier sheet materials made of plastic, for example made of PET. The layer structure of a typical transfer sheet material 8 with plastic carrier is illustrated in FIG. 5. A thin film 8d is connected via intermediate layers 8b, 8b' to a plastic carrier 8a. When the carrier 8a is removed, the intermediate layer 8b remains on the carrier, whereas the intermediate layer 8b' ("release") remains on the thin film 8d, that is to say the intermediate layers 8b, 8b' ensure a clean separation of the thin film from the carrier. The layer structure of a typical transfer sheet material 8 with paper carrier is illustrated in FIG. 6. Here, the carrier 8a and the thin film 8d are connected via a silicone separating layer 8c, which remains on the carrier during the removal process. After lamination and removal of the carrier, a thin film 8d and possibly a residue of an intermediate layer therefore remains on the substrate.

Figure 7:
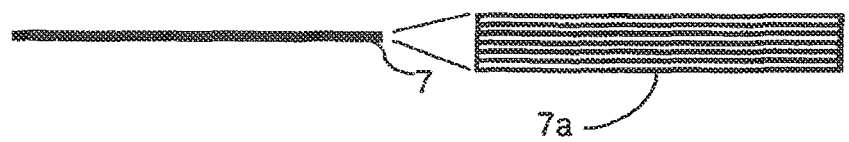
FIG. 7 shows a schematic diagram of the layered structure of a lamination film.
Figure 8:
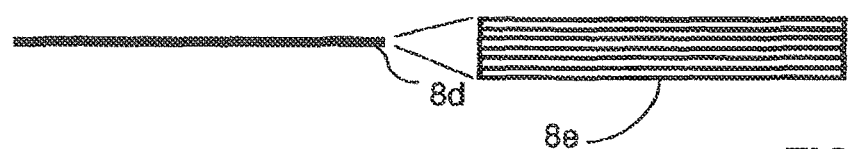
FIG. 8 shows a schematic diagram of the layered structure of a transfer film.

As illustrated in FIG. 7, a lamination sheet material itself may in turn consist of a plurality of layers 7a, wherein these layers can consist of different materials and can perform different functions. In particular, selected layers may carry security features. The lowermost layer is often an adhesive layer. The same is also true, as is illustrated in FIG. 8, for what is known as the thin film 8d of a transfer sheet material 8, said thin film possibly consisting of a number of layers 8e.

Figure 9:
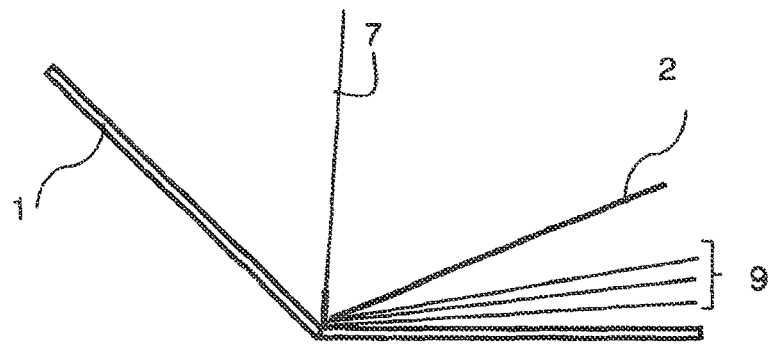
FIG. 9 shows an opened passport booklet with sewn-in lamination film.

A possible shifting of the lamination sheet material in the passport booklet is often prevented by sewing in the lamination sheet material at the relevant point in the booklet before the lamination process. This is illustrated in FIG. 9. The lamination sheet material is sewn here into the passport booklet 1, such that it can be applied directly to the personalised page forming the substrate 2. The personalised page is followed by a number of further passport pages, for example visa pages 9.

Figure 10:
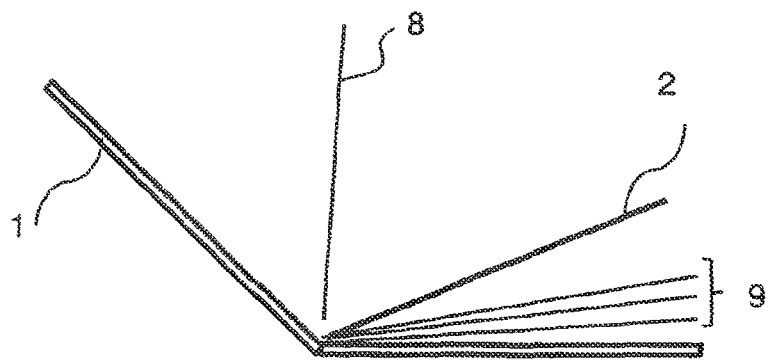
FIG. 10 shows an opened passport booklet with inserted transfer film.

In the case of transfer sheet materials, a carrier component has to be removed again after the lamination process. Transfer sheet materials 8 by contrast are therefore generally loosely inserted and are prevented from shifting by stop edges in the device (FIG. 10).

Figure 11:
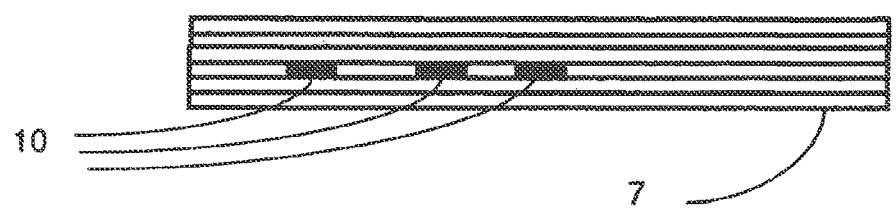
FIG. 11 shows a schematic diagram of a multi-layer thin film or of a multi-layer lamination film with integrated BR-PM in a selected layer.
Figure 12:
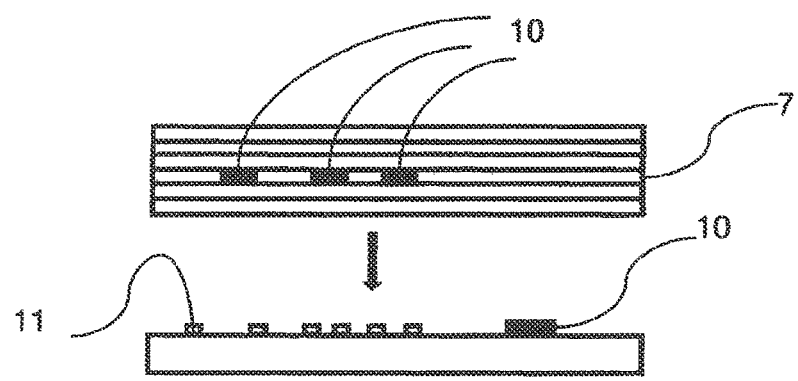
FIG. 12 shows a schematic diagram of a thin film containing BR-PM immediately before the lamination onto a personalised page containing BR-PM.

The lamination sheet material 7 or the transfer sheet material 8 in particular may have one or more layers containing security features on the basis of BR-PM. This is illustrated by way of example in FIG. 11 for the case of a lamination sheet material 7. Here, one of the layers carries security features 10 on the basis of BR-PM. Security features 10 on the basis of BR-PM may also be present additionally or alternatively on the substrate, as is illustrated in FIG. 12. Here, conventional personalised elements 11 (for example letters and symbols formed in printing ink) are generally usually also provided on the substrate. Irrespective of whether temperature-sensitive elements are provided only on or in the substrate, only in the film to be applied or both on/in the substrate and in the film, it is necessary to take specific measures in order to avoid destroying or impairing the function of these elements.

Figure 13:
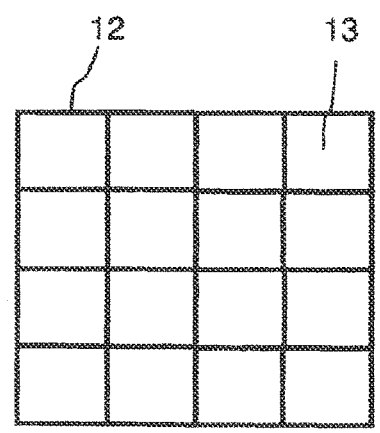
FIG. 13 shows a matrix arrangement of separately heatable sub-elements of the heating surface.
Figure 14:
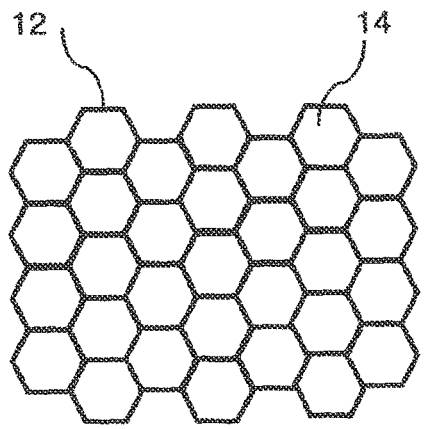
FIG. 14 shows a honeycomb-like arrangement of separately heatable sub-elements of the heating surface.

To this end, the laminator may have a heating surface 12, which is designed such that different sub-regions of this heating surface can be heated by heating elements that can be controlled separately. The separately heatable sub-regions may be arranged for this purpose in the manner of a matrix (square or rectangular regions 13 in FIG. 13), may form a hexagonal arrangement ("honeycomb structure") (hexagonal regions 14 in FIG. 14), or can be arranged relative to one another in any other regular or irregular manner. All sub-regions of the heating surface preferably border one another seamlessly.

Figure 15:
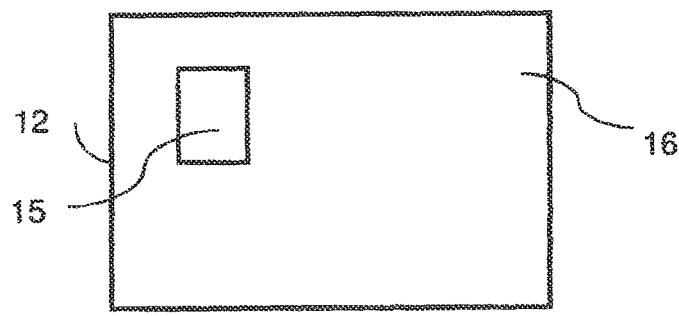
FIG. 15 shows an embodiment of a heating surface with sub-elements in layout-adapted form.
Figure 16:
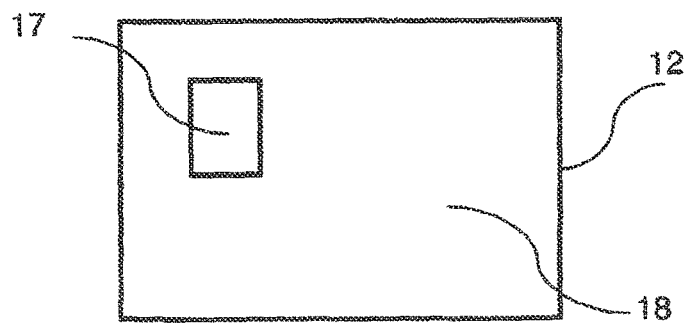
FIG. 16 shows an embodiment of a heating surface with sub-elements in layout-adapted form with reversed temperature ratio compared with FIG. 15.

As illustrated in FIG. 15, a first sub-region 15 for example may be fully surrounded by a second sub-region 16 in the plane. The first sub-region 15 can then be heated selectively to a temperature higher or lower than the sub-region 16. It is also possible, as illustrated in FIG. 16, to selectively leave open one or more cutouts 17 from the heating surface in one or more sub-regions 18 so as to achieve a lower temperature there.

The layout of the sub-regions can be adapted to the layout of the document to be laminated. For example, a cutout in the document, which carries a security feature containing BR-PM, for example an image, can thus be laminated at a lower temperature, whereas the other sub-region around this cutout is laminated fully and uniformly at a higher temperature. The security element containing BR-PM therefore is not exposed during the lamination process to any temperature that restricts or eliminates its function as a visual feature or as an optical data store. Here, it can be accepted that the desired function of the security element containing BR-PM may be absent temporarily up to 48 hours after lamination.

Figure 17:
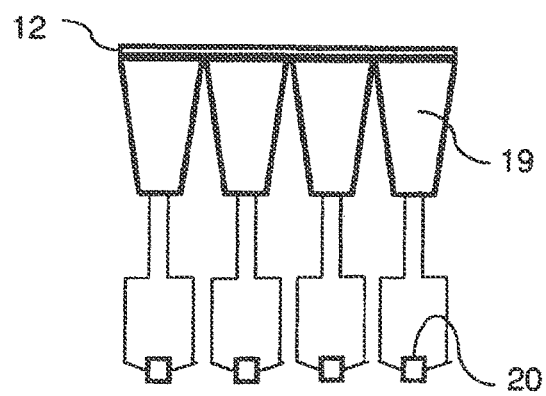
FIG. 17 shows a schematic view from the side of an exemplary embodiment for the heating elements for separate control circuits.
Figure 18:
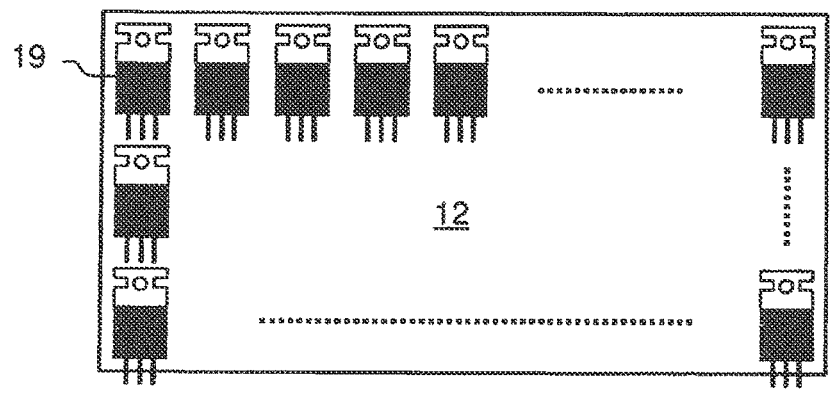
FIG. 18 shows a schematic view of the rear face of a heating surface, with a plurality of heating elements attached thereto in the form of transistors, wherein dashed lines indicate that the transistors are distributed uniformly over the entire rear face.

FIG. 17 illustrates that the heating elements 19 can be precisely thermostatted by a control device having a control circuit 20 for each heating element. To this end, corresponding temperature sensors can be provided. Instead of controlling each heating element 19 individually, it is also conceivable to combine a number of heating elements into groups and to control these heating elements jointly. Individual control is preferred, however. The heating elements 19 are preferably arranged on the rear face of the heating surface such that each heating element can bring the sub-region of the heating surface assigned thereto to a defined temperature over its entire area with minimal temperature gradient. To this end, the heating surface preferably has high thermal conductivity. The heating surface for example may be manufactured from anodised hard aluminium.

It has been found that heating elements which are formed by power transistors are particularly suitable since they respond with low lag and can be controlled very precisely. In addition, the control device only needs to have a low output power since the powers necessary to control the transistor (at the base electrode in the case of bipolar transistors or gate electrode in the case of FETs) are very low in relation to the delivered power. For example, an NPN power transistor BDW93/A/B/C in a TO-220C housing (Inchange Semiconductor, Company, China) with a thermal resistance of 1.5° C./W is one possibility. The cooling flange of the transistor is then connected in a manner known per se to the rear face of the heating surface with use of heat conducting means. This is illustrated schematically in FIG.

18. A multiplicity of transistors are attached flat to the rear face of the heating surface 12 (that is to say to the side of the heating area facing away from the object to be laminated) with use of a heat conducting adhesive. Here, the transistors form a regular matrix. The collector and emitter electrodes of the transistors are each connected to a pole of a power supply, whereas the base-emitter path is actuated via a protective resistor by a control device having a control circuit per transistor in such a way that the transistor in question heats the heating surface to a predetermined temperature. To this end, a temperature sensor may optionally be provided in the region of each transistor, or the electric properties of the transistor can be used themselves for temperature measurement.

In order to achieve a complete temperature equilibration between the heating surface and the personalised page or the part of the document to be laminated, a certain lamination period is necessary for the set temperature profile. Depending on the nature of the document, this is 5 seconds to 20 minutes in order to meet the requirement of satisfactory adhesion of the laminate for high-security documents. For the main page of a passport booklet, which carries the personal data of the passport holder, this time is preferably 30 seconds to 15 minutes, particularly preferably 5 minutes to 12 minutes. A longer lamination period is of course possible but is not preferred in the sense of economic handling.

The opposing pressing surface that is opposite the heating surface does not necessarily need to be heated. In a preferred embodiment, this opposing pressing surface (upper face) is formed by a flexible material (for example soft PVC, PP/EPDM, PU, TPE-E, or rubber, with or without textile insert), which is acted on by pressure on the side facing away from the heating surface. The opposing pressing surface thus develops an adjustable hardness and, due to its soft surface, can adapt to a surface of the lamination or transfer film that is not completely flat. The pliant upper face thus ensures a height compensation of an irregularly formed upper face of the layers to be laminated. This may be caused for example by an irregularly textured surface of the substrate or for example by further applied security elements, such as integrated REID chip, optically diffractive interference-generating elements, or security imprints. An irregular surface may also be produced by an irregular thickness of the film to be applied, as is often the case if the film is provided with security features which have their own spatial demand, for example in the case of imprints, over part of the area, of security elements containing retinal protein. Due to the pliant mating pressing surface, uniform pressure and heat transfer is ensured.

Figure 19:
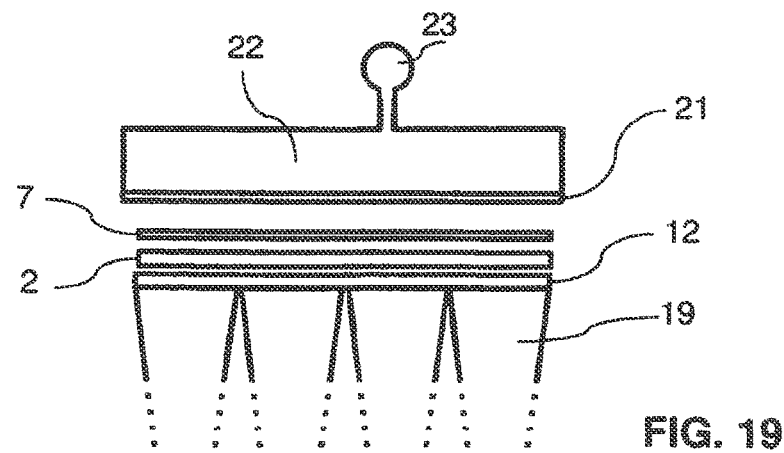
FIG. 19 shows a schematic cross section of the lamination space with heating elements, heating surface, introduced personalised page, lamination film/transfer film and flexible opposing pressing surface.

In a preferred embodiment, which is illustrated schematically in FIG. 19, a pneumatic system with compressed air (opposing pressing surface 21, pneumatic pressure chamber 22, compressor 23) is used for the adjustment of the pressure on the opposing pressing surface. Alternatively, instead of pneumatic operation, hydraulic operation is also conceivable. The prestress of the flexible upper face 21 produced by the pneumatic or hydraulic pressure, besides the height adaptation already mentioned, prevents the pressure from the hot-laminated parts to the unlaminated parts from falling too quickly and therefore producing unsightly edges in the image of the finished laminated document, and prevents air inclusions and bubble formation and generates sufficient adhesion of the sheet material, even in regions of reduced temperature.

The limit temperature for retaining the function of the BR-PM can be increased by a suitable formulation of the preparation containing BR-PM. Formulations of this type may be based on microencapsulated BR-PM molecules, as are described in WO-A1-2010/124908, and may allow a lamination temperature at the points containing bacteriorhodopsin up to 95° C. with retention of the function of bacteriorhodopsin.

On the whole, high-security documents with temperature-sensitive security features, of which the properties meet the highest requirements of protection against manipulation and forgery, can be produced in this way.

Whereas the invention has been explained on the basis of preferred exemplary embodiments, the invention is in no way limited to these examples. It is, e.g., also conceivable to implement the invention with laminators designed in a completely different manner. In particular, applications that require lower security and therefore also only a shorter lamination time are conceivable. For this purpose, a laminator can be provided, in which the heating surface is cylindrical and the substrate and film are passed through jointly between this heating cylinder and a counter cylinder in order to heat the substrate and film. In this case, the heating cylinder may be provided with a number of heating elements, which are arranged offset from one another in the cylinder transverse to the direction of movement of the substrate and film and can be activated separately in order to produce a specific temperature profile transverse to the direction of movement. It is also conceivable to arrange the heating element such that the regions that can be heated differently on the surface of the cylinder form a specific two-dimensional pattern. A multiplicity of further modifications are possible.

The invention claimed is:

1. An apparatus for applying a film to a substrate by lamination, comprising:
    a heating device defining a heating surface for heating at least one of the film and the substrate, the heating device comprising a plurality of heating elements;
    a pressing device for pressing the film onto the substrate in a heated state; and
    a control device comprising a plurality of independent control circuits, the control circuits separately controlling heating powers of different heating elements of the heating device such that said heating elements act on different regions of the heating surface selectively with different heating powers, so as to selectively expose different regions of at least one of the film and the substrate to different temperatures, each control circuit being configured to control the heating power of one or more selected heating elements in such a manner that thermostatic control of said selected heating elements is achieved,
    wherein the control circuits are configured to control the heating elements in such a way that the heating surface in a first region has at least one predetermined first temperature while the heating surface in a second region has a temperature that is at least 10° C. lower than the first temperature.

2. The apparatus according to claim 1, wherein the heating surface has a plurality of regions, wherein in each case one or more of the heating elements cooperates with one of these regions of the heating surface in order to heat said heating surface, and wherein the regions are arranged in a regular two-dimensional pattern.

3. The apparatus according to claim 1, wherein the heating elements are formed by power semi-conductors.

4. The apparatus according to claim 1, wherein the pressing device comprises a pliant opposing surface arranged opposite the heating surface.

5. The apparatus according to claim 4, wherein the opposing surface defines a pressure chamber configured to be acted on pneumatically with pressure.

6. The apparatus according to claim 1, wherein the heating elements are formed by power transistors.

7. The apparatus according to claim 1, wherein the heating surface in the second region has a temperature that is at least 20° C. lower than the first temperature.

8. The apparatus according to claim 1, wherein the second temperature is lower than 100° C.

9. The apparatus according to claim 1, wherein the first region completely surrounds the second region.

10. The apparatus according to claim 1, further comprising at least one of a feed slot and a drawer for receiving the substrate.

11. The apparatus according to claim 1, further comprising a document having a substrate and a film, at least one of the substrate and the film having at least one temperature-sensitive element, and wherein at least one of the film and the substrate is selectively exposed to the different temperatures in the different regions in such a way that the function of the temperature-sensitive element is retained.

12. A method for providing a substrate with a film by lamination, comprising:
pressing the film onto the substrate under the action of heat while different regions of at least one of the film and the substrate are selectively exposed to different temperatures by means of a heating device defining a heating surface,
wherein the heating device comprises a plurality of heating elements, and wherein different heating elements of the heating device are separately controlled by means of a plurality of independent control circuits comprised in a control device such that said heating elements act on different regions of the heating surface selectively with different heating powers, the control circuits controlling the heating power of one or more selected heating elements in such a manner that thermostatic control of said selected heating elements is achieved,
wherein the control circuits control the heating elements in such a way that the heating surface in a first region has at least one predetermined first temperature while the heating surface in a second region has a temperature that is at least 10° C. lower than the first temperature.

13. The method according to claim 12, wherein a first region of at least one of the film and the substrate is exposed to at least one first predetermined temperature in order to connect the film in the first region to the substrate in a permanent manner, and wherein a second region of at least one of the film and the substrate is exposed to a temperature that is at least 10° C. lower, preferably at least 20° C. lower, than the first temperature.

14. The method according to claim 12, wherein at least one of the film and the substrate comprises at least one temperature-sensitive element, and wherein at least one of the film and the substrate is selectively exposed to different temperatures during the pressing process in different regions, in such a way that the function of the temperature-sensitive element is retained.

15. The method according to claim 14, wherein the temperature-sensitive element contains a retinal protein, and wherein at least one of the film and the substrate, in a region containing the temperature-sensitive element, is exposed to a temperature of at most 95° C. and is exposed in a region not containing the temperature-sensitive element to a temperature of at least 110° C.

16. The method according to claim 15, wherein the retinal protein is bacteriorhodopsin.

* * * * *